Figure 1:
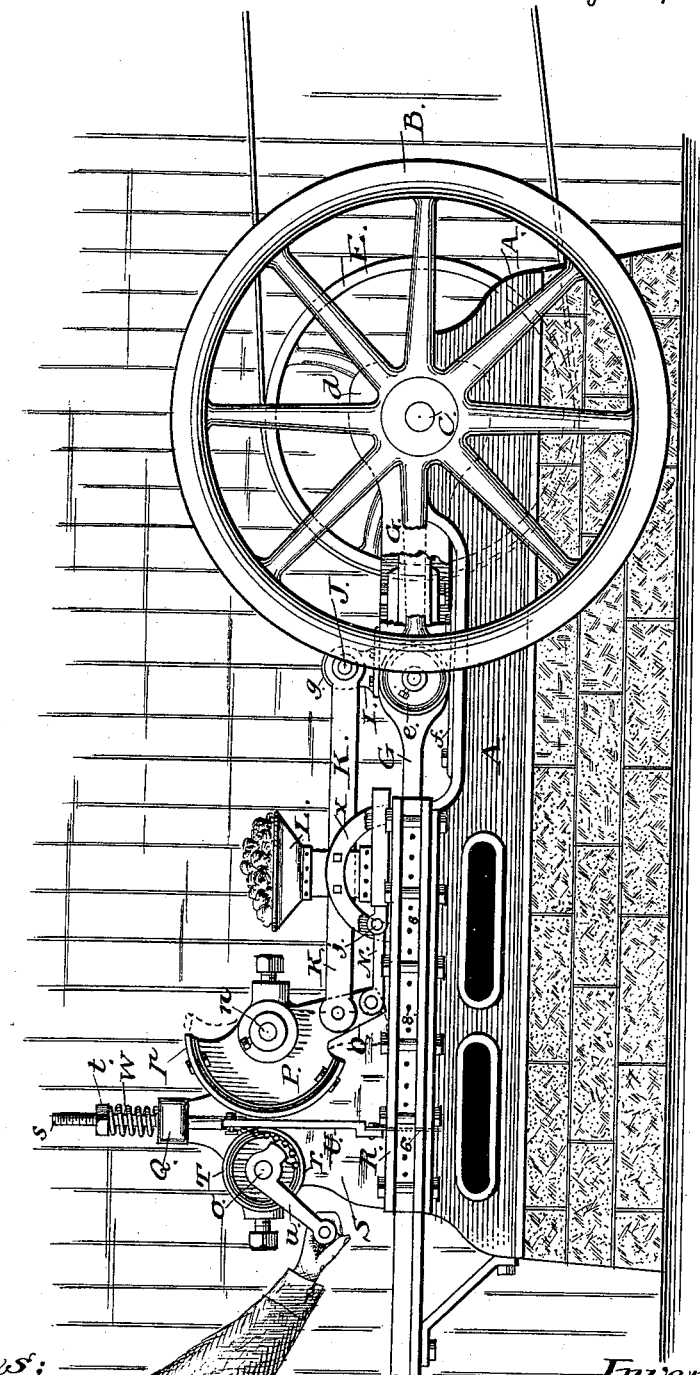

(No Model.) 4 Sheets—Sheet 1.

W. H. STEWART.
BRICK MACHINE.

No. 323,083. Patented July 28, 1885.

Witnesses:
T. Walter Fowler
H. B. Applewhait

Inventor:
Wm. H. Stewart
per Attys.
A. H. Evans & Co.

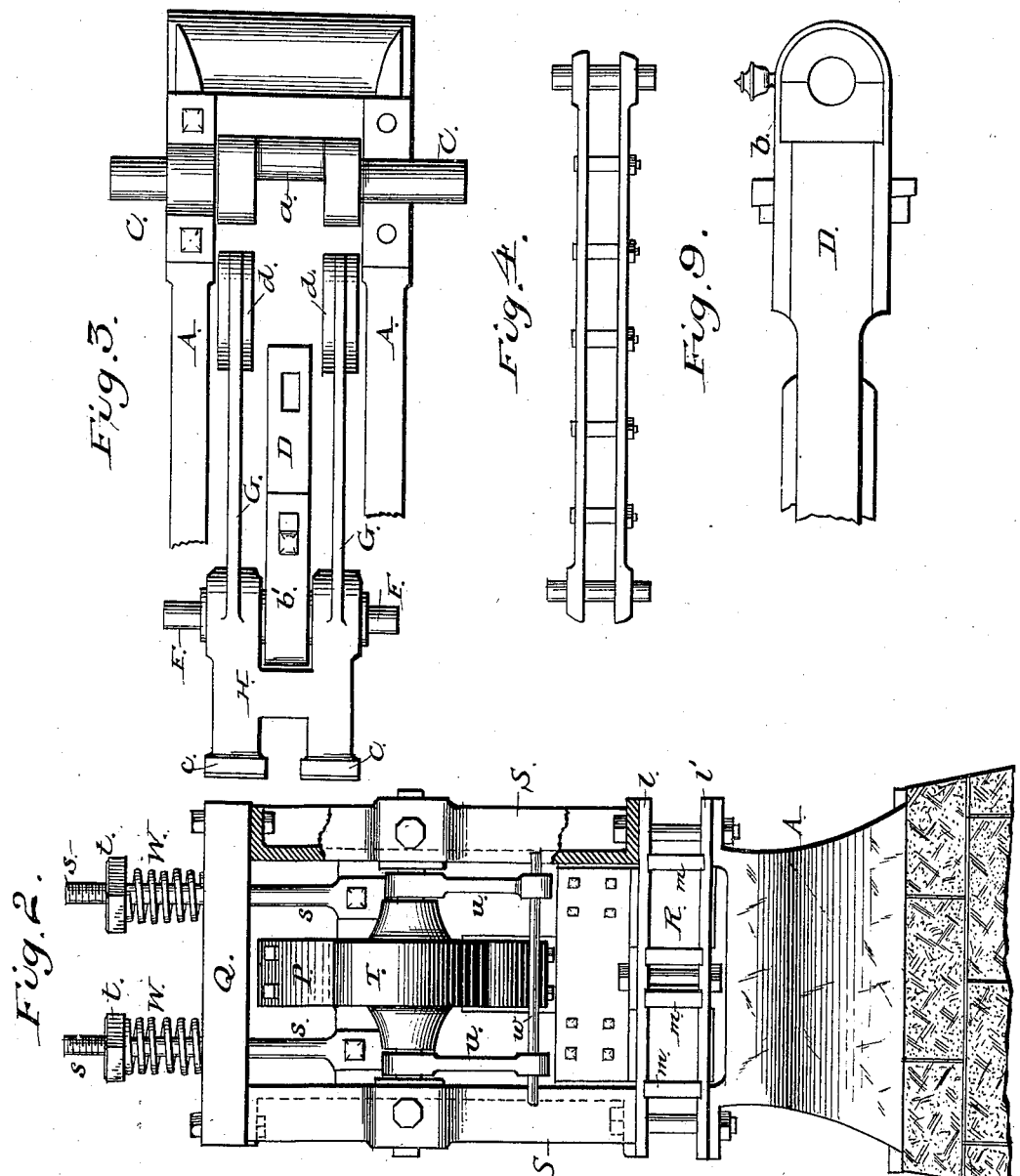

(No Model.) 4 Sheets—Sheet 3.
W. H. STEWART.
BRICK MACHINE.
No. 323,083. Patented July 28, 1885.
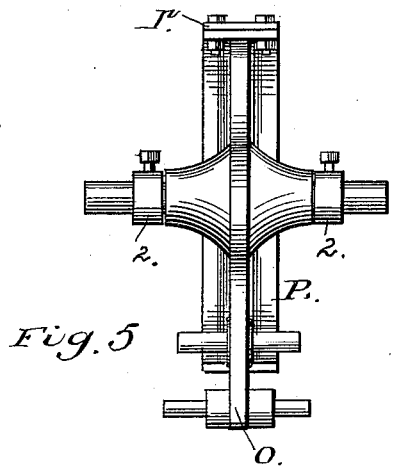
Fig. 5.
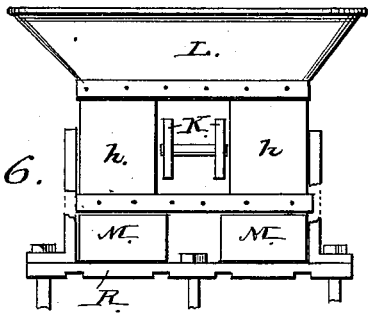
Fig. 6.
Fig. 12.
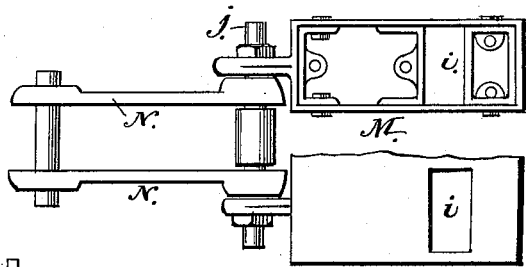
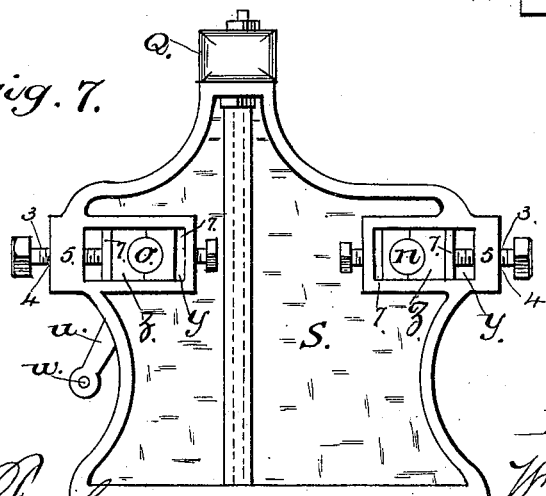
Fig. 7.
Attest:
T. Walter Fowler
H. B. Applewhaite
Inventor;
Wm. H. Stewart
per attys.
A. H. Evans & Co.

(No Model.)
W. H. STEWART.
BRICK MACHINE.
No. 323,083. Patented July 28, 1885.
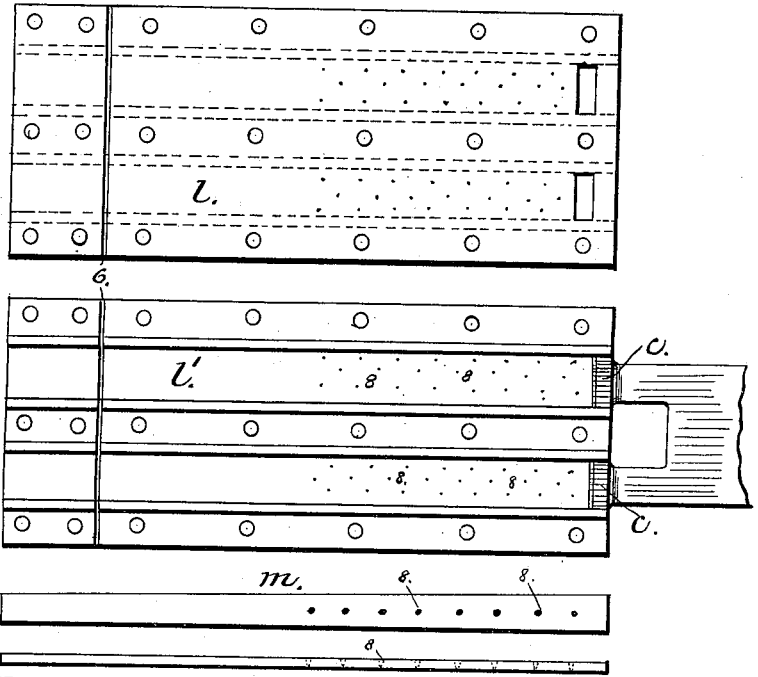
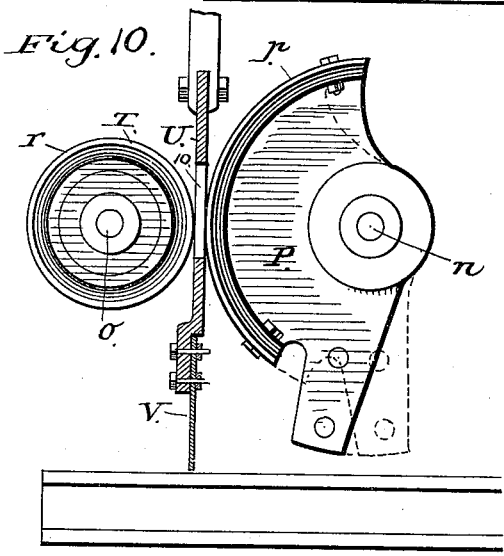
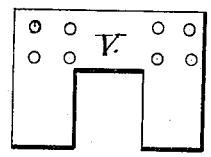
Witnesses;
P. Walter Fowler
L. B. Applewhaite
Inventor;
Wm H. Stewart
per Atty.
A. H. Evans & Co.

UNITED STATES PATENT OFFICE.

WILLIAM H. STEWART, OF BOONVILLE, MISSOURI.

BRICK-MACHINE.

SPECIFICATION forming part of Letters Patent No. 323,083, dated July 28, 1885.

Application filed November 4, 1884. (No model.)

*To all whom it may concern:*

Be it known that I, WILLIAM H. STEWART, a citizen of the United States, residing at Boonville, in the county of Cooper and State of Missouri, have invented certain new and useful Improvements in Brick-Machines, of which the following is a full, clear, and exact description thereof, reference being had to the accompanying drawings, making a part of this specification, and to the letters of reference marked thereon, in which similar letters indicate corresponding parts in the several figures.

Figure 1 is a side elevation, with the frame-work partially broken away, of a brick-machine embodying my improvements. Fig. 2 is an end view of the same. Fig. 3 is a plan view of the shaft $a$, the plunger, and connecting-arms D and G. Figs. 4 to 12, inclusive, represent details of construction, to be hereinafter referred to.

My invention relates to a machine for making bricks; and it consists in a mechanism for feeding a limited quantity of clay to two or more passages, and a mechanism for compressing said clay within these passages to form a rectangular body of compressed clay, and a means whereby a portion of said clay, is severed from the main body to form a brick of the requisite size and form.

It also consists in the passages for the clay, having tapered sides and provided with small openings in their sides for the escape of gases, and in the construction, arrangement, and combination of the several parts, all of which I shall hereinafter fully set forth and claim.

In the said drawings A represents a suitable bed or frame, which may be supported upon a foundation of stone or otherwise raised to permit of the revolution of a large fly-wheel, B, which is keyed upon an end of a shaft, C, loosely journaled upon and in the bed of the machine.

It will be observed upon reference to Fig. 3 that the portion of shaft C immediately next to the inner sides of the frame A has a diameter considerably greater than its extended ends, (which are inclosed by suitable journal-boxes,) while its central portion is turned or otherwise formed with a crank, $a$, to which is connected a reciprocating bar, D, the purpose of which will be hereinafter fully described.

E is a band-wheel secured to one of the projected ends of shaft C, and through this band-wheel power is received to operate the machine.

As before stated, the connecting-bar D is attached to the crank portion of shaft C, and this may be accomplished by a suitable strap, $b$, passing around the shaft, its ends being bolted or otherwise secured to the bar. The opposite end of connecting-bar D is also provided with a strap, $b'$, which encircles a shaft, F, which passes through the plunger and has its extended ends reduced in a manner similar to the shaft C. The straps $b$ $b'$ may one or both be provided with suitable bearing-blocks, as shown in Fig. 9.

G G represent connecting-arms rigidly secured to and forming part of the plunger H, which has formed on its ends the two arms or compressors $c$, each faced with a steel plate, while the opposite end of the connecting-arms G are formed with hubs $d$, which partially encircle that portion of the shaft C immediately next to the inner sides of the frame. These hubs have open ends, and simply act as a bearing for the arms G, and also act as a guide to assist in keeping them in a horizontal position.

It will be readily observed from the drawings that the movement of the band-wheel E will impart motion to the shaft C, the revolution of which will cause the connecting-bar D to move the plunger backward and forward.

Upon the shaft F is loosely mounted the guide-rollers $e$, which, in conjunction with the hubs $d$, support the bars D and G, at the same time keeping them in a horizontal position. These rollers or wheels travel backward and forward upon plates $f$, which are securely bolted to the frame of the machine, and this arrangement enables me to easily adjust the wheels or to replace them with others when too much worn.

I represents a casting firmly bolted to the arms G, as shown in Fig. 1. This casting is provided with side flanges and a central vertical flange, $g$, through which passes a pintle, J, which furnishes a bearing for the horizontal rods K, one of which is located on each side of the flange $g$ in such manner that the reciprocating movement of the bars D and G will cause these arms to move backward and forward and operate a segment-wheel, the purpose of which will be hereinafter fully developed.

Suitably secured upon the frame is a hopper, L, for containing the dry or moist clay, and this hopper is provided with two spouts, $h$, between which the rods K pass; and M represents a two-part sliding frame provided with openings $i$ into which the clay is fed from the hopper, and through which the said clay is dropped into the passages for compressing it. This frame M is caused to slide back and forth, so as to bring the openings $i$ alternately under the spouts and over suitable openings formed in the top of the passages, and it is provided with projecting lugs, through which passes a pintle, $j$, upon which is pivotally secured the short arms N, their opposite ends being connected to the projecting arm O of the segment-wheel P, and to this arm O is also connected the ends of rods K, so that the movement of rods D and G will impart motion to the segment-wheel P through the rods K, and at the same time cause the frame M to move back and forward.

R represents the mold-frame, which is provided with flanges by means of which it may be bolted to the flanges of frame A. By reference to Figs. 1, 2, and 8, it will be seen this frame R consists, essentially, of the top and bottom plates, $l$ $l'$, each of which are provided with longitudinal grooves, into which are fitted the edges of the partitions $m$, as shown in Fig. 2, thereby forming passages in which the clay is passed and in which it is compressed by the plunger, the compressors $c$ $c$ snugly fitting the passages, so that when the openings in the frame M have received their full amount of clay and the said frame been carried backward until the said openings align themselves with the openings formed in the plate $l$ the clay is dropped into the passages, when the forward movement of the plunger will press the deposited clay farther into the passage, at the same time cause the frame M to resume its normal position and receive another installment of clay, which is deposited in the same manner. After the plunger has made its full stroke the return movement of the shaft C and bars D and G will cause the compressors to be withdrawn from under the openings in the top of the mold-frame, and draw the frame M backward until a fresh supply of clay has been deposited and compressed in the manner previously referred to, and feeding and compressing the clay in the passages in small quantities and adding to the length of the clay about one inch of compressed clay to every revolution of shaft C, thereby forming within each of the passages a rectangular body of compressed clay, which is fed forward until operated upon by a vertically-moving cutter or knife, which I will now proceed to describe.

S S represent castings, which are constructed, preferably, as shown in the drawings, and are provided with flanges by which they are bolted to the bed of the machine and to a cross-timber, Q.

Within the castings S are suitable journals for the ends of the shafts $n$ and $o$, and upon the former is mounted the segment-wheel P, before referred to, to the periphery of which is bolted a steel band or plate, $p$, and upon the shaft $o$; and mounted in a manner similar to wheel P is an idle-pulley, T, having a band or tire, $r$, encircling its periphery. These wheels P and T are located on opposite sides of a plate, U, which has a vertical motion in grooves formed on the inner sides of the castings S. This plate U is bent near its lower end to form a shoulder, against which the upper end of a suitable knife or cutting-off blade, V, abuts. This knife is bolted to the plate U, and is in shape similar to that shown in detail in Fig. 11, having two blades which pass downward and lay directly over an opening, 6, formed in the top of the mold-frame R.

Bolted to the plate U and extending upwardly through openings in the timber Q are the rods $s$, having threaded ends to receive the adjusting-nuts $t$, between which and the timber Q are interposed the coiled springs W, the object of which will be more fully made known.

Upon the shaft $o$ are mounted the angular levers $u$, their long arms being joined together by a rod, $w$, and their short arms being connected by a chain or its equivalent to the sliding plate U, as shown in Fig. 1.

X X are curved braces or rods bolted to the hopper and frame, as seen in Fig. 1.

Referring again to castings S, (see Fig. 7,) $y$ $y$ are oblong openings formed in the castings to receive the brass boxes, these boxes being flanged on the inside, so that when once inserted they will be held in place by collars 2. (See Fig. 5.) Set-screws or heavy-threaded bolts 3 loosely pass through openings 4 and through a recessed threaded nut, 5. These set-screws pass through the nuts and terminate against steel plates 7, made in size to conform to that of the end of brass boxes $z$, and adjust the bearings by turning the set-screws to the right or left in order that the steel plate 7 may be made to work properly within the grooved guides without undue strain, although somewhat worn.

Referring again to Figs. 8 and 1, it will be observed that the plates of which the sides of the mold-frame M are constructed are perforated with small openings 8. These openings are made with a countersink-drill, in size of about one-half inch diameter, on the outside of the plates, diminishing in size until they terminate to that of about the size of a sewing-needle at the inside of the plates, as many being made and in such places as desired, the purpose of which is to form an exit for any and all gases and air, some of which is bound to be left in the clay that receives its first stroke from the plunger. In other machines these gases could not quickly find an exit, and consequently become most powerfully condensed, so that they would expand when the plungers recede and crack the brick—a bad feature, and scarcely discernible. After the brick makes its exit from the mold or passages and is placed in the kiln the crack opens and makes the brick imperfect and unsatisfactory.

Referring again to Fig. 8, it will be observed that the frame R is so grooved and constructed that the passages taper slightly as they recede from the plunger. This is for the purpose of more powerfully compressing the clay, as it is compelled to travel through the tapered passage or mold, thus giving ample time for driving out all air and gases through the perforations, and also for the purpose of creating a resisting force to counteract the blows and form a resisting-bed against which the plunger is to do its work.

From the foregoing construction it is evident that if the segment-wheel P stood at the dotted line (see Figs. 1 and 10) and the coiled springs W were to support the steel plate U in the position shown in Fig. 10, then the segment-wheel P could traverse its allotted distance back and forth for any length of time required, and the plate U would (because of the opening 10) remain stationary; but if the plate U were pressed or pulled slightly downward by the levers, then the coiled springs W would be depressed, and would permit the steel plate U to move down, and that portion of the plate directly over opening 10 would become engaged with or between segment-wheel P and idle-wheel T, and if the depending arm of wheel P were at that moment traveling forward to dotted line and the clay were being pressed forward in the frame R by the forward movement of plunger H, then the steel plate U would not be affected; but as soon as plunger H has made its stroke and started back, then would the steel plate be quickly and powerfully driven downward, as it becomes clamped between the segment-wheel P and the idle-wheel T, and the knife or cutter V would be driven down through the compressed clay, driving a small portion of clay before it, and come to rest, as seen in Fig. 1. When the plunger again starts forward, the motion of the segment-wheel will be reversed, and the knife or cutter will be lifted out and above the slot in the mold-frame by a reverse movement and before the clay within the mold-frame will have advanced because of the forward movement of plunger. Again, it is evident that when the segment-wheel P has finished its forward and upward stroke, then the opening 10 will again come between the segment-wheel P and the idle-wheel T, and will, at this part of the stroke, always give the control of the steel plate to the coiled springs, when the upward pressure will assist in lifting the plate U higher, so that the future movement of segment-wheel will not affect the steel plate until the clay (which is supposed to be advancing an inch, more or less, at every forward movement of the plunger) has crowded the detached brick out of the open end of frame R. (See Fig. 1.) When the operator again starts the steel plate downward, by the movement of the levers u, the plate U again engages and forces the cutter down through the mold-frame, detaching another brick, to be likewise crowded out of the frame R by the same process as before. The steel plate is then carried up and again left in the control of the coiled springs. Thus it will be noticed that the feeding and compressing of the clay is, by the action of the feeding-frame M and the plunger H, operating at one end of the frame R, and the cutting-off and discharging done at the other—a very important feature in the art of dry-clay brick-making.

The cutting of the brick is left entirely within the control of the brick-maker—another very important feature—for if at any time the feeding and compressing is carried on with an increased or diminished proportion of clay to the stroke of plunger H, then the operator causes the cutting off to be done at shorter intervals, or simply waits until the end of the brick arrives at the point indicated in dotted arrow, (see Fig. 1,) segment-wheel P always holding itself in readiness to perform its duty of cutting off the compressed clay into the proper length desired—another important feature—for in making pavement-brick he can make them as long as desired by simply having a gage-mark (not shown) placed upon the table, indicating the proper length wanted.

Having thus described my invention, what I claim as new, and desire to secure by Letters Patent, is—

1. In a brick-machine, a two-part sliding frame provided with openings for the clay received from the hopper, in combination with a compressing-chamber formed with openings near one end, through which the clay passes into the said chamber, a crank-shaft for changing the position of the sliding frame, and a plunger for compressing the clay, substantially as described.

2. A brick-machine provided with a horizontal plunger, in combination with a two-part sliding frame operated by suitable connecting-arms, to receive from the hopper and deposit within a compressing-chamber at each revolution of a crank-shaft an amount of clay less than that required to make a brick, substantially as described.

3. In a brick-machine, the shaft $a$ and connecting-bars D and G, in combination with a flanged plate bolted to said bars so as to receive their movement, substantially as described, and for the purpose set forth.

4. A brick-machine having a crank-shaft, $a$, bars D and G, and a plunger, in combination with a flanged plate bolted to said bars, whereby the movement of said bars is communicated to other connecting-bars to operate a sliding mold-frame, M, substantially as described.

5. In a brick-machine, a crank-shaft and connecting-bars for operating a two-part sliding frame, whereby an amount of clay less than is required to make a brick is deposited into a compressing-chamber, to be operated upon by each revolution of the crank-shaft, the said compressing-chamber being provided with suitable exits for the escape of the gases, substantially as herein set forth.

6. In a brick-machine, a rectangular compressing-chamber formed with two or more passages, said chamber having apertures in its sides for the escape of gases, substantially as described.

7. In a brick-machine, a compressing-chamber provided with partitions m, whereby two or more rectangular passages are formed, substantially as described.

8. In a brick-machine, a compressing-chamber with open ends, consisting of the grooved top and bottom plates and partitions m, thereby forming two or more rectangular passages, into which the clay is received and compressed, substantially as described.

9. In a brick-machine, a compressing-chamber for receiving the loose clay in fractional quantities less than a brick, to be operated upon by a plunger, and to form a rectangular body of compressed clay, substantially as described.

10. In a brick-machine, a compressing-chamber consisting of the grooved top and bottom plates and the partitions m, and provided with suitable exits for the escape of gases, in combination with a sliding frame and its operative mechanism, whereby the clay is deposited within said compressing-chamber in fractional quantities less than a brick to form a rectangular body of compressed clay, and a knife or cutter for severing a portion of said clay, substantially as described.

11. In a brick-machine, and in combination with the arms K and their actuating mechanism, suitable frictional devices for operating a vertically-moving plate carrying a knife or cutter, substantially as described.

12. In a brick-machine, the arms K and their actuating mechanism, in combination with suitable frictional devices for operating a vertically-moving plate carrying a knife or cutter, and a compressing-chamber having a slot or opening for the entrance of said knife, substantially as described.

13. In a brick-machine, the shaft a, provided with reduced ends and a crank portion, in combination with the bars G, with open ends partially encircling the shaft, and the bar D, to which the plunger is attached, substantially as described.

14. In a brick-machine, the shaft a and bars D and G, as described, in combination with a plunger attached to one end of bar D, and suitable guide-wheels traveling upon the bed of the machine to support said bars, substantially as described.

15. In a brick-machine, the bars D and G, in combination with a casting, I, having flanges by which it is bolted to the bars, and the connecting-arms K, secured to said casting and to a segment-wheel, P, substantially as and for the purpose set forth.

16. In a brick-machine, the segment-wheel P, provided with a depending arm, in combination with the bars D, G, and K, and the connecting-arms for actuating a sliding mold-frame, substantially as described.

17. In a brick-machine, the castings S, with suitable bearings for the shafts n and o, in combination with a vertically-moving plate and frictional devices for operating said plate, substantially as described.

18. In a brick-machine, the castings S, provided with grooves and suitable adjustable bearing-blocks, as set forth, in combination with a vertically-moving slotted plate carrying a knife or cutter, segment-wheel P, idle-pulley T, and springs for withdrawing the knife from the compressing-chamber, substantially as described.

19. In a brick-machine, the compressing-chamber with tapering sides and partitions, and provided with openings for the entrance of the clay and exits for the gases therein contained, in combination with a vertically-moving cutter having two or more blades passing through slots in the top of the compressing-chamber to sever a portion of the compressed clay about equal to the length of a brick, substantially as described.

20. In a brick-machine, a frictional device for operating a knife or cutter to sever a portion of compressed clay, consisting of the segment P and an idle-pulley provided with angular levers and chains, substantially as described.

21. In a brick-machine, the segment-wheel P, having a depending arm to which is attached the bars K and N, and connecting-bars, herein set forth, for operating the segment to raise or lower a plate carrying a cutter, and to reciprocate a sliding frame, M, substantially as described.

W. H. STEWART.

Witnesses:
J. T. McClanahan,
J. A. Wettendorf.